(12) United States Patent
Dinjus et al.

(10) Patent No.: US 8,043,391 B2
(45) Date of Patent: Oct. 25, 2011

(54) METHOD FOR PRODUCING AND PREPARING FAST PYROLYSIS PRODUCTS FROM BIOMASS FOR AN ENTRAINED-FLOW PRESSURE GASIFICATION

(75) Inventors: Eckhard Dinjus, Leimersheim (DE); Edmund Henrich, Dettenheim (DE); Klaus Raffelt, Karlsruhe (DE); Friedhelm Weirich, Neuthard (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 862 days.

(21) Appl. No.: 12/090,323

(22) PCT Filed: Jul. 29, 2006

(86) PCT No.: PCT/EP2006/007530
§ 371 (c)(1),
(2), (4) Date: Apr. 15, 2008

(87) PCT Pub. No.: WO2007/045291
PCT Pub. Date: Apr. 26, 2007

(65) Prior Publication Data
US 2008/0236043 A1 Oct. 2, 2008

(30) Foreign Application Priority Data
Oct. 15, 2005 (DE) .................. 10 2005 049 375

(51) Int. Cl.
*C10J 3/46* (2006.01)
(52) U.S. Cl. ............... 48/197 R; 48/197 FM; 48/197 A; 48/209; 48/210; 48/211; 48/212; 48/213; 48/214 R
(58) Field of Classification Search ................ 48/197 R, 48/197 FM, 197 A, 209, 210, 211, 212, 213, 48/214 R
See application file for complete search history.

(56) References Cited

U.S. PATENT DOCUMENTS

| 4,322,222 A * | 3/1982 | Sass ........................... 48/197 R |
| 2011/0107670 A1 * | 5/2011 | Galley et al. ............... 48/197 R |

FOREIGN PATENT DOCUMENTS

| DE | 10151054 | 4/2003 |
| DE | 10345672 | 5/2005 |
| EP | 1520900 | 4/2005 |
| GB | 2125429 | 3/1984 |
| WO | WO-0068338 | 11/2000 |
| WO | WO-03033624 | 4/2003 |

OTHER PUBLICATIONS

E. Heinrich et al. "Flugstromvergasung von fluessigen Pyrolyseprodukten bei hohem Druck: Ein neues Konzept zur Biomassevergasung", DGMK-Fachbereichstagung, Hamburg, Germany, vol. 22, Apr. 22-24, 2002, pp. 95-102, XP001126938.
E. Henrich et al. "Synthesegas aus verflüssigter Biomasse", DKMK-Fachbereichstagung Energetische Nutzung von Biomassen, Apr. 19-21, 2004, http://www.dgmk.de/kohle/abstracts_velen6/Henrich.pdf.
E. Henrich et al. "Hochwertige Biomassenutzung durch Flugstrom-Druckvergasung von Pyrolyseprodukten", 13. Internationales Sonnenforum, Berlin , Germany, Sep. 12-14, 2002, (http://www.bfafh.de./bfh-pers/pdf/pub_meier_1_02.pdf).
Examination Report from the German Patent and Trade Mark Office in German Publication Application No. 10 2005 049 375.0 dated Sep. 1, 2006.
International Search Report for International Application No. PCT/EP2006/00753, mailed Nov. 16, 2006.

* cited by examiner

*Primary Examiner* — Timothy Vanoy
(74) *Attorney, Agent, or Firm* — Leydig, Voit & Mayer, Ltd.

(57) ABSTRACT

A method is provided for producing and preparing fast pyrolysis products from a biomass for entrained-flow pressure gasification that includes: heating of the biomass under exclusion of oxygen in a pyrolysis reactor, a temperature of between 400 to 600° C. being established for one to 50 seconds, such that the biomass reacts to form porous pyrolysis coke, pyrolysis condensate and pyrolysis gas; and drawing off the pyrolysis gas; condensing vaporous constituents of the pyrolysis condensate in a plurality of condensation stages so as to: condense, in a first condensation stage, at temperatures above the dew point of water, a low-temperature carbonization tar from the vaporous constituents; and condense and separate at temperatures between 0° C. and the dew point of water, in at least one subsequent condensation stage, an aqueous solution of oxygen containing organic compounds.

20 Claims, No Drawings

METHOD FOR PRODUCING AND PREPARING FAST PYROLYSIS PRODUCTS FROM BIOMASS FOR AN ENTRAINED-FLOW PRESSURE GASIFICATION

CROSS-REFERENCE TO RELATED APPLICATIONS

This is a U.S. national phase application under 35 U.S.C. §371 of International Patent Application No. PCT/EP2006/007530, filed Jul. 29, 2006, and claims benefit of German Patent Application No. 10 2005 049 375.0, filed Oct. 15, 2005. The International Application was published in German on Apr. 26, 2007 as WO 2007/045291 A1 under PCT Article 21(2).

FIELD

The present invention relates to a method for producing and preparing fast pyrolysis products from biomass for an entrained-flow pressure gasification. The method is an integral part of a process chain for producing synthetic gases from biomass such as lignocellulose, i.e., cellulose- and lignin-containing (latin: lignum=wood) substances, such as wood, straw, hay, but also paper.

BACKGROUND

A fast pyrolysis has as its purpose the conversion of carbon-containing feedstock, such as biomass, into highly liquid pyrolysis condensate (pyrolysis oil), as well as into not very solid pyrolysis coke and pyrolysis gas. In the case of the aforementioned biomass, a fast pyrolysis is performed under exclusion of oxygen within a few seconds, preferably in about one second, at approximately 400 to 600° C., preferably at about 500° C., a bio-oil content of 40 to 80% by weight and a biocoke content of only 10 to 30% by weight being reached.

Thus, the fast pyrolysis—also known as flash pyrolysis—is a special pyrolysis method in which a considerable amount of liquid pyrolysis condensate and little gas and coke are formed. In particular, wood and straw (lignocellulose) are able to be liquefied to over 50 to 80% into bio-oil.

The pyrolysis gas is typically separated off from the other two pyrolysis products, the pyrolysis coke and the pyrolysis condensate, and is thus usable as fuel for the aforementioned pyrolysis process.

The remaining liquid pyrolysis condensate and the pyrolysis coke are fed as a mixture of these constituents that forms an oil sludge (bio-oil sludge, slurry) from the fast pyrolysis, to an entrained-flow gasification, where the mentioned products are atomized and gasified in a hypostoichiometric oxygen stream.

By employing entrained-flow gasification at high temperatures and pressures, virtually tar- and methane-free raw synthesis gas is able to be produced at a high conversion efficiency which, above all, is advantageous in a subsequent synthesis. This cannot be accomplished in fixed-bed or fluidized-bed reactors, due primarily to the lower operating temperature. However, when working with an entrained-flow gasification, substantial outlay is entailed in preparing the fuels. Biomass, in particular lignocellulose, such as wood and straw, is able to be most readily converted by fast pyrolysis into a pumpable liquid or a slurry that is pumped using simple pumps into an entrained-flow pressure gasifier and atomized and gasified using oxygen.

However, the known method exhibits a few decisive limitations which complicate or substantially restrict the application, or necessitate special precautions.

Most notably, in terms of its composition, a slurry is often not stable or storable, i.e., following a storage or transport time of greater or lesser length, a segregation, increase in viscosity or other property variations are to be expected. On the one hand, the pyrolysis coke content can settle out in the slurry; on the other hand, pyrolysis condensate contents can separate, an aqueous and an organic phase thereby forming. The aqueous phase may contain greater or lesser quantities of water-soluble organic compounds, in particular acetic acid, alcohols and other hydrocarbons having oxygen or other heteroatoms.

What is dangerous in the case of gasification under oxygen in an entrained-flow pressure gasifier is, in particular, a locally heated aqueous component in the slurry, i.e., an aqueous phase of a mainly low calorific value (for example, low temperature carbonization wastewater) having only small fractions of organic components (for example, alcohols) and pyrolysis coke. Namely, if the aqueous phase exhibits a low calorific value due to a segregation that occurred, i.e., if it contains barely combustible compounds in dissolved or dispersed form, this results in an excess of oxygen in the entrained-flow pressure gasifier that can mix with previously produced synthetic gas and lead to an explosion.

Until now, the dangers and limitations referred to have made it difficult to carry out an entrained-flow pressure gasification of biomass on a large scale. In particular, the aforementioned segregations greatly restrict the capability to transport the intermediate product, the slurry, over relatively long distances, for example, from a decentralized pyrolysis, which preferably takes place directly at the producer of the biomass, to a central entrained-flow pressure gasifier for producing biosynthesis gas. In addition, many slurries produced from seasonal waste material from farming and logging are only storable for a limited period of time in a closed container such as a tank.

When pyrolysis condensates are stored in a tank, even in some cases for relatively long periods of time, there is the risk, in particular, of a phase separation occurring in the pyrolysis condensate between an aqueous phase of low calorific value and an organic phase of high calorific value. The risk arises, in particular, when the tank contents are not able to be thoroughly mixed continuously and with adequate efficiency.

Also, volatizable, low-boiling constituents can alter the composition of the organic and aqueous phase, depending on the type of storage, for one and the same pyrolysis condensate over the course of a storage time.

SUMMARY

An aspect of the present invention is to provide an improved method for preparing fast pyrolysis products from biomass for an entrained-flow pressure gasification that, in particular, substantially minimizes the risk of undesired segregation of slurries during storage, prior to charging of the same into the entrained-flow pressure gasifier.

In an embodiment the present invention provides a method for producing and preparing fast pyrolysis products from a biomass for an entrained-flow pressure gasification that includes: heating of the biomass under exclusion of oxygen in a pyrolysis reactor, a temperature of between 400 to 600° C. being established for one to 50 seconds, the biomass reacting to form porous pyrolysis coke, pyrolysis condensate and pyrolysis gas; drawing off the pyrolysis gas; and condensing vaporous constituents of the pyrolysis condensate in a plurality of condensation stages so as to: condense, in a first condensation stage, at temperatures above the dew point of water, a low-temperature carbonization tar from the vaporous constituents; and condense and separate, at temperatures between 0° C. and the dew point of water, in at least one subsequent condensation stage, an aqueous solution of oxygen-containing organic compounds.

BRIEF DESCRIPTION OF THE DRAWINGS

Aspects of the present invention will now be described by way of exemplary embodiments with reference to the following drawings, in which:

DETAILED DESCRIPTION

According to an aspect of the present invention, a method is provided for producing and/or preparing fast pyrolysis products from biomass for an entrained-flow pressure gasification. It includes a plurality of method steps, namely, heating the biomass under exclusion of oxygen in a pyrolysis reactor, the biomass reacting to form pyrolysis coke, pyrolysis condensate and pyrolysis gas, condensing the vaporous constituents of the pyrolysis condensate, as well as drawing off the remaining pyrolysis gases. Prior to condensation of the vapors, the pyrolysis coke may be collected separately, but also simultaneously, together with the first condensate fraction. The condensation process takes place in a plurality of condensation stages, one constituent separating off during each condensation stage.

One feature of the present invention relates to the chronology of the aforementioned condensation stages, in a first condensation stage above the dew point of water at approximately 90° C., a low-temperature carbonization tar being condensed and separated from the pyrolysis vapors, as well as in at least one subsequent condensation stage, preferably between 0° C. (flow temperature of water) and the aforementioned dew point of water, an aqueous solution of oxygen-containing organic compounds referred to as low-temperature carbonization wastewater, being condensed and separated.

The method includes at least one further condensation stage following the first condensation stage and preferably before the aforementioned last condensation stage, in which, at a settable temperature between 0° C. and the dew point of water at approximately 90° C., a plurality of organic pyrolysis products are incrementally condensed out.

By employing incremental condensation, it is advantageously possible to isolate different phases in a simple, as well as reliably controllable process. Analogously to coal pyrolysis, products from a condensation above the water dew point of the pyrolysis product stream are referred to here as low-temperature carbonization tars (pyrolysis tars). The condensates that are subsequently isolated between 0° C. and the dew point of water are referred to as low-temperature carbonization wastewater. Low-temperature carbonization wastewater contains a multiplicity of volatile, oxygen-containing organic compounds, mainly acetic acid, the moisture of the pyrolysis material, as well as the reaction water first produced during pyrolysis (for example, within the range of 15% by weight of the dry lignocellulose).

As a result of the material separation of constituents of the pyrolysis condensate, at least two pyrolysis products are obtained that exhibit good stability properties during storage and transport and advantageously little tendency for further segregation. These intermediate products are preferably produced in decentrally located pyrolysis systems and, as the case may be, following an optional storage, delivered separately to a central entrained-flow pressure gasifier and, only shortly before the entrained-flow pressure gasification, blended together preferably in a continuous mixing process to form a slurry to be gasified having the desired and adjustable homogeneous composition.

The pyrolysis cokes are discharged in a dry and pulverulent form, or in a moist form, and together with the condensed vapors from the pyrolysis reactor. If they are precipitated by a hot cyclone directly at the pyrolysis temperature, then no partial catalytic breakdown of the condensable pyrolysis vapors into coke and gas takes place due to the ash-containing coke particles. Pyrolysis coke particles are brittle and, therefore, are able to be readily further comminuted. From the loose, dry pyrolysis coke powder and the different pyrolysis condensates, pyrolysis tars or aqueous solutions, crumbs, pumpable pastes or slurries of higher density are able to be produced, which are able to be stored and, above all, transported more compactly and cost-effectively than the original biomass. Moreover, as feedstocks, liquids or slurries, which are pumpable and are pneumatically atomizable or pulverizable using oxygen, for entrained-flow gasifiers that are operated at very high pressures above the later synthesis pressures, are technically much better and easier to use than fuel powder from looser, dry pyrolysis coke powder or comminuted dry biomass in unpyrolyzed form.

Therefore, the present invention includes a preferred separation of the pyrolysis coke and a blending of low-temperature carbonization tar and/or of organic constituents into the pyrolysis coke during or after the first condensation stage, i.e., following a condensation and separation of the low-temperature carbonization tar components, preferably, however, before the pyrolysis coke is discharged from the pyrolysis system.

Within the context of the present invention, both low-ash, as well as high-ash lignocellulose having over 2% by weight of ash may be used as biomass, in the case of high-ash biomass, it being possible to obtain two liquids when working with a single-stage condensation. In the condensate, a dark, heavy sedimentation tar (low-temperature carbonization tar) frequently separates out, collects fine coke dust and sinks to the bottom in the light foul water phase. On the other hand, in the case of comminuted bark-free wood, which typically only contains $\leq 1\%$ by weight of ash, in a quench condensation process at room temperature, only one single homogeneous, oleaginous bio-oil or pyrolysis oil is obtained that is miscible with water, but not with fuel heating oil. However, homogeneous pyrolysis oils (pyrolysis condensate) of moist feedstocks are frequently unstable because, at higher moisture contents of over 30% by weight, they have a hardly predictable tendency to spontaneously segregate into an aqueous solution of low calorific value of CHO compounds (low-temperature carbonization wastewater), and a heavier, organic low-temperature carbonization tar phase of high caloric value from a multiplicity of CHO compositions. This problem may be resolved from the outset by implementing a multistage condensation process.

Alternatively, the aforementioned first condensation stage of the method in accordance with the present invention is carried out without or subsequently to a preceding partial separation of the pyrolysis coke from the pyrolysis condensate, the low-temperature carbonization tar being absorbed by the porous pyrolysis coke. As a result, the pyrolysis coke particles no longer have a dust form, but rather a moist crumbly consistency, into which the entire low-temperature carbonization tar is ideally incorporated. Low-temperature carbonization tar acts as a binding agent among coke particles, and thus very effectively promotes agglomeration and suppresses a fundamentally explosive dust formation.

In a fast pyrolysis using heat carriers, such as sand, SiC or other materials, the brittle pyrolysis cokes are ground so small that they are namely completely discharged along with the pyrolysis gases and vapors and are usually separated off downstream from the reactor in a hot cyclone at pyrolysis temperature in flowable form. Cokes of this kind are frequently pyrophoric. If cooled fast pyrolysis coke comes into contact with the air for the first time, it may heat up to the point of spontaneous ignition due to the large inner surface area of $\geqq 100$ m$^2$/g.

On the other hand, depending on the condensate fraction, long-term stable pyrolysis condensate/pyrolysis coke mixtures that are dust-free and non-spontaneously ignitable are crumbly to pasty. In particular, the crumbs mostly contain more coke than a pumpable slurry production allows. The density and handling are adjustable to a desired value, in particular as a function of the condensate fraction. The density is preferably between ~300 kg/m$^3$ for dry coke powder and ~1300 kg/m$^3$ for a dense paste. Values of slightly below 1 t/m$^3$ are considered to be especially favorable transport densities for the railroad. This corresponds approximately to the densities of coke crumbs that are not completely saturated with pyrolysis condensate.

On the other hand, due to a pronounced pyrophoric tendency when in contact with air, it would only be possible to handle dry pyrolysis coke, i.e., pyrolysis coke that does not have any or only has small pyrolysis condensate fractions, by expending substantial technical outlay for safety. Both dust formation, as well as spontaneous ignitability may be drastically reduced by using blending processes during which pyrolysis condensates are absorbed into the pore system of the cokes.

Even if only one single quench condensate, in the present case the pyrolysis condensate (pyrolysis oil, bio-oil), is obtained during the fast pyrolysis, then, by absorbing a portion of this condensate, the pyrolysis coke powder may also be converted into a more compact, non-dust forming transport form (crumbs or paste) having the desired consistency.

In the same way, immediately following the first condensation stage, constituents of the pyrolysis condensate and of the pyrolysis coke still present in gaseous and/or vaporous form following the first condensation stage may be separated out. These constituents are removed in this manner from the subsequent condensation stages which additionally minimizes the risk of contamination.

The aforementioned processes preferably include a separate (i.e., each having its own) conveyance of, as the case may be, the low-temperature carbonization tar-containing pyrolysis coke, on the one hand, and of the pyrolysis condensates, such as the low-temperature carbonization wastewater, for example, on the other hand, as individual material streams and, as the case may be, by way of an intermediary storage in closed containers (for example, shipping containers, such as tank cars and silo cars for a preferred shipment by rail or storage tanks, such as silos or tanks), as well as a blending of all or of a portion (at least one) of the aforementioned pyrolysis products to produce a continuous, homogeneous mixed stream (slurry) or also with other additional constituents. Ideally, in the process, all of the pyrolysis products obtained from the fast pyrolysis in accordance with the present invention are introduced into the mixed stream.

It is not necessary that all of the products involved (individual material streams) be blended in simultaneously. Rather, the chronology of the blending-in process is oriented towards always ensuring the homogeneity of the material stream during the subsequent gasification in an entrained-flow pressure gasifier. Pyrolysis coke particles are preferably first blended into a low-viscosity stream of low-temperature carbonization wastewater or, conversely, blended to form an intermediate mixed-product stream. In this context, static or moving mixers (for example, the confluences of a plurality of individual channels, respectively mixing devices) may promote the homogeneity of the material stream during the blending process. A good storability and transportability of the individual pyrolysis products renders possible an especially cost-effective blending of individual material streams on a relatively large scale in a central mixing device and/or, to avoid a segregation of the mixed stream, the blending takes place immediately, at a maximum of two minutes, and preferably less than 30 seconds before the entrained-flow pressure gasification. The pyrolysis coke particles preferably undergo wet comminution and disagglomeration in the material stream in that they are diluted with hot pyrolysis condensate in a warming process in efficient mixing apparatuses, for example in a colloid mixer, by utilizing the comminution and mixing heat, as well as additional waste heat.

Thus, it is within the scope of the present invention for portions of high-viscosity individual material streams to be intermediately stored in a closed container and not to be removable again therefrom until after low-viscosity low-temperature carbonization wastewater is added (dilution or suspension).

Instead of a normal slow pyrolysis, lignocellulose requires a fast pyrolysis because it allows sufficient pyrolysis condensate to be obtained for suspending the entirety of the pyrolysis coke powder therein to form a pumpable slurry, in particular in the case of high-ash feedstocks such as straw. Due to the high porosity of the pyrolysis coke powder, about twice as much condensate as coke is needed to produce a pumpable slurry. This corresponds to a volume ratio of solid particles to liquid of approximately 1:1, as is also known, for example, from the production of pulverized coal/water slurries, for which the solid/liquid weight ratio is about 70/30% by weight due to the non-porous powder. In the case of pyrolysis coke, roughly half of the pyrolysis condensate is first absorbed into the pore system, and, as a lubricant around the granules, only the second half contributes to pumpability. The manipulable solids content may possibly still be slightly increased by a broad particle size spectrum, efficient homogenization, disagglomeration and comminution, for example, in a colloid mill, as well as by heating. This is important when working with higher-ash solids such as rice straw (ash ~15% by weight), for example, for which the coke yield is so high that it is difficult to produce sufficient condensate for a pumpable slurry. Its viscosity is reduced by heating to 0.2 Pas, thereby enabling it to still be efficiently pneumatically atomized using conventional means. By heating the slurries, the waste heat from the gasification, synthesis, and reprocessing processes is used for simultaneously improving viscosity, pumpability and atomization capability, as well as for increasing the manipulable loading of solids.

In the case of warm slurries that are very heavily loaded with pyrolysis coke, a thixotropic behavior is often observed. To utilize this effect, the time period for handling the hot slurries between the production thereof and atomization in the gasifier is limited. It is typical, for example, for one or a few minutes to elapse before an up to 90° C. hot, free flowing, fresh bio-oil/coke slurry coming directly from a colloid mixer, solidifies again into a hot pulp to the point where paste begins to form. The rigorousness (severity) of a tolerable thermal loading when heating the slurries is also limited, not the least by the thermal stability of the pyrolysis tars, in particular.

Due to the desire to utilize the heat-up behavior, thixotropy and homogeneity, etc., hot feedstock slurries that are heavily loaded with pyrolysis cokes, but are still readily pumpable and atomizable, may be produced for the gasifier only shortly before they are fed into the gasifier. As in the case of cement paste production, high loading and homogenization may be accomplished through the use of a colloid mixer, for example, whose action is based on high forces of gravity >$10^4$ s$^{-1}$. For reasons of economics, it is prudent for such a substantial technical outlay to be expended only once, namely shortly before the process of feeding into the entrained-flow pressure gasifier. Should colloidal mixing or similar operations be eliminated due to the technical and financial outlay entailed, it becomes more difficult to produce slurries that are sedimentation-stable enough for storage and transport. Therefore, for storage and transport purposes, it is practical to only use slurry precursors (inter alia, individual material streams) that are simple to produce, for which any property variations during storage or transport may again be considered when producing the final slurries under optimal manufacturing conditions.

A centralized slurry production in a large-scale installation (entrained-flow pressure gasifier) is to be preferred not only due to the aforementioned economic considerations. Individual charges (for example from various tank cars and silo cars) that differ to a greater or lesser degree must be blended together to form a slurry of preferably long-term constant composition in accordance with the slag and CHO composition, as well as calorific value. The hourly throughput rates of the large installations are within the range of 500 t/h of slurry; the maximum possible transport tank contents only about 80 tons. Various products are shipped from the many decentrally located installations. By implementing a planned menu compilation of the various delivery charges for the individual material streams, this may be linked in a technically simpler manner to operations such as mixing, grinding, homogenization, heat-up processes, etc.

Moreover, a number of advantages are derived by heating the slurries during production: utilization of waste heat with reduction of the $O_2$ consumption and improvement of the cold gas efficiency in the gasifier, lower pumping capacity due to viscosity reduction. However, maintaining the temperature of the slurries or even heating the slurries for longer periods of time may lead to unwanted decomposition reactions and should be avoided.

When cooled from about 90° C. condensation temperature to room temperature, low-temperature carbonization tars, in particular those of wood, may solidify to a solid mass due to the freezing out of solids or exceedance of the solubility of constituents. Effects of this kind may be intensified by temperatures of down to below 0° C. in the case of storage and transport in the winter. Slurries or condensates (for example, bio-oils) that have gelated or, in some instances, partially segregated must first be heated up then in the shipping containers, prior to the pumping operation, at considerable outlay. This could be prevented by expending additional outlay for heated shipping containers.

A sedimentation does not have a disturbing effect when working with very loose, readily resuspendable sediments. In the case of slurry feedstocks having low-temperature carbonization wastewater, the formation of more solid sediments was often observed following a residence or transport time period. Sedimentation is able to be delayed as the result of smaller particles (grinding) and good homogeneity (colloid mixer), a broader size spectrum and higher viscosity, in particular of the low-temperature carbonization tars, as well as pyrolysis oils. Charges produced by expending the appropriate outlay were also still readily suspendable and pumpable after more than one year.

PRACTICAL EXAMPLES

Besides being dependent on the approach used, the liquid and solid yields of the fast pyrolysis are also dependent on the starting material and its inorganic substance content. In the following practical examples, wood pyrolysis is synonymous with a fast pyrolysis involving a high proportion of liquid products; straw pyrolysis is synonymous with a fast pyrolysis involving a low proportion of liquid products.

Example 1

In the course of a wood pyrolysis, pyrolysis coke is separated off in one or a plurality of hot cyclones prior to the pyrolysis vapors passing through the condensation. The liquid condensate is subsequently obtained in two stages, the viscosity of the low-temperature carbonization tar being adjusted as a function of the temperature of the first condensation stage. In this context, the product ratios of the liquid are approximately 15 to 40% of organic low-temperature carbonization tar and 60-85% of aqueous condensate. The organic tar is subsequently blended with the dry pyrolysis coke.

Thus, in this manner, from 1000 kg of biomass used, one obtains between 260 and 530 kg of organic pyrolysis coke of crumbly, moist consistency having a solids content of between 28 and 57%, as well as between 370 and 640 kg of low-temperature carbonization wastewater. In the loose state, the moist pyrolysis coke has a bulk density of up to 300 kg/m$^3$ and is compressible for transport to a density of 500 to 900 kg/m$^3$. A fine grinding is preferably carried out directly at the gasification installation, either in a preceding method step or together with the blending in of additional pyrolysis condensate to form a mixed stream of the desired formulation, for example in a colloid mixer. It is possible to additionally admix organic low-temperature carbonization tar or low-temperature carbonization wastewater to allow the mixed stream to be further formulated for the gasification. If the crumbly pyrolysis coke containing organic low-temperature carbonization tar is mixed with low-temperature carbonization wastewater to a target concentration, then, from that point on until gasification, the slurry must be continuously agitated to prevent segregation.

Example 2

The method differs from that described in Example 1 in that the pyrolysis cokes are blended with an aqueous condensate fraction, and the organic condensate fractions are transported from the pyrolysis installation to the central gasification installation without admixture of any solids.

Thus, in this manner, from 1000 kg of biomass used, one obtains between 520 and 790 kg of organic pyrolysis coke of crumbly, moist consistency having a solids content of between 19 and 29%, as well as between 120 and 380 kg of low-temperature carbonization tar. In this case, only aqueous condensate is used in the final premixing of the mixed stream in a desired target concentration, since, otherwise, an agglomeration will occur in the mixed stream. The sedimentation tar contains, above all, high-boiling constituents having boiling points above 150° C.; has a high viscosity of more than 3 Pas at 20° C. and a high calorific value of more than 20 GJ/t. This low-temperature carbonization tar may be heated without the admixture of solids using what is generally known as the low-temperature waste heat (usable process waste heat) of the integrated gasification and synthesis installation fed into the pressure gasifier. The overall efficiency of the multi-stage process for biomass utilization is enhanced by utilizing the low-temperature waste heat energy.

Example 3

In the course of a wood pyrolysis, wood pyrolysis coke having particles sizes greater than 50 µm is separated from the other reaction products in a hot cyclone. In this context, the pyrolysis process is controlled in such a way that, at 35%, for example, the fine fraction (particle sizes smaller than 50 µm) in the pyrolysis coke is high. The mentioned fine fraction is precipitated out at 90° C., together with the pyrolysis vapors, in the first condensation stage. In the process, organic low-temperature carbonization tar and fine coke are precipitated out together as stable-in-storage, moist crumbly coke. On the other hand, the dry, coarse fraction of the pyrolysis coke (particle sizes greater than 50 µm) is blended with aqueous condensate constituents to produce a moist, granular consistency. In the process, the aqueous condensate constituents are completely absorbed by the pore volume of the pyrolysis coke.

From 1000 kg of biomass, one obtains 170 to 430 kg of organic crumbly coke having a solids content of between 12 and 42%, as well as 470 to 780 kg of aqueous crumbly coke having a solids content of between 13 and 21%. The organic and the aqueous crumbly coke are transported separately to a central gasification installation. There, the organic crumbly coke is disagglomerated and is subsequently fed directly into the gasifier with or also without the addition of additional liquid. Besides blending to the target formulation, the aqueous crumbly coke also requires an additional grinding step, since, because of its brief reaction times, the entrained-flow pressure gasifier is only suited for solid particles smaller than 100 µm. However, experience has shown that the pyrolysis coke may contain particles up to a size of 800 µm. When selecting suitable processes, grinding and mixing may be combined with one another.

Example 4

In the course of a straw pyrolysis, in a method step preceding the first condensation step, coarse-grained pyrolysis coke (particle sizes greater than 50 µm) is separated off from the pyrolysis vapors in a hot cyclone. Subsequently thereto, in the course of a first condensation step, at 120° C., a moist tar-containing pyrolysis coke having particle sizes smaller than 50 µm and a liquid content of 60 to 70% is precipitated out. The liquid pyrolysis condensate is then subsequently obtained in a plurality of further condensation stages. The coarse-grained pyrolysis coke is subsequently blended with the liquid pyrolysis condensate to a crumbly, moist consistency.

From 1000 kg of biomass, one obtains 160 to 350 kg of organic crumbly coke having a solids content of between 35 and 73%, as well as 272 to 640 kg of aqueous crumbly coke having a solids content of between 12 and 51%. Transport, grinding and fine-scale mixing are carried out in a manner comparable to that described in Example 3. Two specific examples including measurement data are given in Table 1 (wheat-straw chaff having 6% ash, 6% moisture content; particle size limit of the cyclone not defined).

TABLE 1

| Organic coke (crumbly) | Solids content in the organic crumbly coke | Aqueous condensate | Cyclone coke | Solids content in the aqueous crumbly coke |
|---|---|---|---|---|
| 254 kg | 73% | 442 kg | 61 kg | 12% |
| 343 kg | 39% | 272 kg | 99 kg | 27% |

Example 5

Prior to a condensation of the pyrolysis vapors, no solid is precipitated out; rather, the entire pyrolysis coke is separated off in the first condensation stage, together with the low-temperature carbonization tar. In the subsequent condensation stages, low-temperature carbonization wastewater is obtained.

In this manner, from 1000 kg of wood chips as biomass, one obtains 220 to 530 kg of tar-containing crumbly coke having a solids content of between 28 and 67%, as well as 370 to 680 kg of low-temperature carbonization wastewater. From 1000 kg of straw as biomass, one obtains 390 to 580 kg of tar-containing crumbly coke having a solids content of between 61 and 89%, as well as 220 to 410 kg of low-temperature carbonization wastewater.

Tar-containing crumbly coke and aqueous condensate are transported separately to the central gasification installation. Prior to the gasification, a wet grinding is required for purposes of disagglomeration, during which the wood pyrolysis coke may already reach a processible consistency. In the case of the crumbly coke from the straw pyrolysis, a charging of pyrolysis condensate is necessary in any case, in order to obtain a pumpable slurry. In this context, the separately transported low-temperature carbonization wastewater of the process described here may be used, but also other liquids from other decentrally located pyrolysis devices, for example, that are supplied to the central gasification installation. Three specific examples including measurement data are given in Table 2 (wheat-straw chaff having 6% ash, 6% moisture content, respectively wood shavings having 1% ash, 6-10% moisture content).

TABLE 2

| Biomass | Organic coke (crumbly) | Solids content in the organic crumbly coke | Aqueous condensate |
|---|---|---|---|
| straw chaff | 458 kg | 37% | 239 kg |
| wood chips | 358 kg | 36% | 434 kg |
| wood chips | 460 kg | 38% | 291 kg |

Example 6

Crumbly coke from a straw pyrolysis in accordance with Example 5 is blended in a central gasification installation with low-temperature carbonization wastewater of the wood pyrolysis from Example 5 to form a mixed stream having a desired target concentration ratio.

Example 6.1

575 kg of tar-containing crumbly coke of the straw pyrolysis having a solids content of 61% are blended, for example, with 275 kg of aqueous condensate of the wood pyrolysis to produce a slurry having 37% solids content.

Example 6.2

395 kg of crumbly coke of the straw pyrolysis having a solids content of 89% are blended with 675 kg of aqueous condensate of the wood pyrolysis to produce a slurry having a 33% solids content.

Other numerous possible combinations are derived from Examples 1 through 5, since, depending on the feedstock and the approach used, different quantities and types of moist crumbly coke and of solids-free condensate may be produced in the decentrally located pyrolysis installations and supplied to the central gasifier. It is especially in the pyrolysis of wood products that a high proportion of liquid condensates is produced that may be useful for premixing the slurries when working with solids-rich product ratios.

Example 7

The following transportable pyrolysis products, which may be delivered to the central gasification installation, are derived from Examples 1 through 5: crumbly coke having organic low-temperature carbonization tar as a liquid constituent, crumbly coke having low-temperature carbonization wastewater as a liquid constituent, pure low-temperature carbonization wastewater and pure low-temperature carbonization tar. In addition, the crumbly cokes may be additionally divided into those containing only fine coke (particle sizes smaller than 50 μm) and those that must still be ground. The pyrolysis process (pyrolysis stages) and the processing of the pyrolysis products are controlled in such a way that the six aforementioned types of transport have standardized properties and, upon arrival at the central gasification installation, the pyrolysis products from many decentrally located installations are passed into large collecting tanks in which they are collected and blended. The partial standardization of the mixed-current intermediate products substantially simplifies the fine-scale mixing to produce the desired mixed stream of the gasification. The solids content of the preferably crumbly pyrolysis cokes is controlled by the removal efficiency of the hot cyclone (geometry and gas flow velocities); the ratio between organic and aqueous condensate by the residence time of the pyrolysis vapors in the hot zone and by the condensation temperature.

The invention claimed is:

1. A method for producing and preparing fast pyrolysis products from a biomass for entrained-flow pressure gasification, the method comprising:
heating the biomass under exclusion of oxygen in a pyrolysis reactor, a temperature of between 400 to 600° C. being established for one to 50 seconds, such that the biomass reacts to form porous pyrolysis coke, pyrolysis condensate and pyrolysis gas;
drawing off the pyrolysis gas; and
condensing vaporous constituents of the pyrolysis condensate in a plurality of condensation stages so as to:
condense, in a first condensation stage, at temperatures above the dew point of water, a low-temperature carbonization tar from the vaporous constituents; and
condense and separate, in at least one subsequent condensation stage, at temperatures between 0° C. and the dew point of water, an aqueous solution of oxygen-containing organic compounds.

2. The method as recited in claim 1, further comprising blending at least one of the low-temperature carbonization tar and the organic compounds into the pyrolysis coke during the first condensation stage.

3. The method as recited in claim 2, further comprising, prior to the first condensation stage and the blending, providing for absorption of the at least one of the low-temperature carbonization tar and, the organic compounds by at least a portion of the porous pyrolysis coke before the at least a portion of porous pyrolysis coke is separated from the pyrolysis condensates.

4. The method as recited in claim 3, further comprising:
discharging the pyrolysis coke from a pyrolysis system; and
prior to the discharging, blending a previously separated pyrolysis, coke into the pyrolysis system.

5. The method as recited in claim 4, further comprising:
conveying separately a condensate-containing pyrolysis coke and liquid condensate constituents as mixed-stream intermediate products to a blending process;
blending, in the blending process, the Mixed-stream intermediate products to form a continuous, homogeneous mixed stream; and
gasifying the continuous, homogeneous mixed stream in an entrained-flow pressure gasifier.

6. The method as recited in claim 4, wherein the pyrolysis coke includes at least one of carbonization tar and low-temperature carbonization wastewater and liquid condensate constituents from the condensing include at least one of low-temperature carbonization wastewater or low-temperature carbonization tar.

7. The method as recited in claim 6, wherein the pyrolysis coke is discharged without any transfer taking place between containers or silos.

8. The method as recited in claim 7, wherein the blending the at least one of the low-temperature carbonization tar and the organic compounds into the pyrolysis coke is carried out in a central mixing device immediately before the entrained-flow pressure gasification.

9. The method as recited in claim 6, further comprising, prior to the blending the at least one of the low-temperature carbonization tar and the organic compounds into the pyrolysis coke, performing a pre-blending by introducing low-temperature carbonization wastewater into a container or silo for further conveyance of the pyrolysis coke.

10. The method as recited in claim 6, wherein the blending the at least one of the low-temperature carbonization tar and the organic compounds into the pyrolysis coke is carried out in a central mixing device immediately before the entrained-flow pressure gasification.

11. The method as recited in claim 4, wherein the pyrolysis coke is discharged into at least one of closed containers and silos configured for at least one of intermediate storage and transport.

12. The method as recited in claim 11, wherein the blending the at least one of the low-temperature carbonization tar and the organic compounds into the pyrolysis coke is carried out in a central mixing device immediately before the entrained-flow pressure gasification.

13. The method as recited in claim 3, further comprising:
conveying separately a condensate-containing pyrolysis coke and liquid condensate constituents as mixed-stream intermediate products to a blending process;
blending, in the blending process, the mixed-stream intermediate products to form a continuous, homogeneous mixed stream; and
gasifying the continuous, homogeneous mixed stream in an entrained-flow pressure gasifier.

14. The method as recited in claim 3, further comprising heating the mixed-stream intermediate products before or during the blending.

15. The method as recited in claim 2, further comprising heating the mixed-stream intermediate products before or during the blending.

16. The method as recited in claim 1, further comprising completely separating the pyrolysis coke from the pyrolysis condensate prior to the first condensation stage.

17. The method as recited in claim 16, further comprising:
 discharging the pyrolysis coke from a pyrolysis system; and
 prior to the discharging, blending a previously separated pyrolysis coke into the pyrolysis system.

18. The method as recited in claim 17, further comprising:
 conveying separately a condensate-containing pyrolysis coke and liquid condensate constituents as mixed-stream intermediate products to a blending process;
 blending, in the blending process, the mixed-stream intermediate, products to form a continuous, homogeneous mixed stream; and
 gasifying the continuous, homogeneous mixed stream in an entrained-flow pressure gasifier.

19. The method as recited in claim 16, further comprising:
 conveying separately a condensate-containing pyrolysis coke and liquid condensate constituents as mixed-stream intermediate products to a blending process;
 blending, in the blending process, the mixed-stream intermediate products to form a continuous, homogeneous mixed stream; and
 gasifying the continuous, homogeneous mixed stream in an entrained-flow pressure gasifier.

20. The method as recited in claim 16, further comprising heating the mixed-stream intermediate products before or during the blending.

* * * * *